United States Patent [19]

Hirata et al.

[11] 4,131,658

[45] Dec. 26, 1978

[54] METHOD FOR ATOMIZING OIL AND AN APPARATUS THEREFOR

[75] Inventors: Masakuni Hirata, Tokyo; Yukio Matsuzaki, Kawasaki, both of Japan

[73] Assignee: Nippon Oil Company Limited, Tokyo, Japan

[21] Appl. No.: 873,901

[22] Filed: Jan. 31, 1978

Related U.S. Application Data

[63] Continuation of Ser. No. 681,192, Apr. 28, 1976, abandoned.

[30] Foreign Application Priority Data

Jul. 17, 1975 [JP] Japan .................................. 50/86661

[51] Int. Cl.² ............................................. B01F 3/04
[52] U.S. Cl. .................................... 261/142; 219/275; 219/311; 261/78 A; 261/128; 261/151; 261/DIG. 65
[58] Field of Search ............... 261/76, 78 A, 128, 142, 261/151, 152, 5-8, DIG. 54, DIG. 65, 138, 139; 184/1 R, 1 E, 104 R; 55/257 R; 219/271-276, 310, 311; 165/60

[56] References Cited

U.S. PATENT DOCUMENTS

| | | | |
|---|---|---|---|
| 1,254,348 | 1/1918 | Palmer | 261/142 |
| 2,020,325 | 11/1935 | Myhren et al. | 261/78 A |
| 3,191,718 | 6/1965 | Haywood | 261/76 X |
| 3,215,417 | 11/1965 | Whitmore et al. | 261/142 |
| 3,243,014 | 3/1966 | Bjorklund | 261/78 A X |
| 3,439,777 | 4/1969 | Gothberg | 261/76 X |
| 3,664,818 | 5/1972 | Kramer | 261/76 X |

Primary Examiner—Richard L. Chiesa

[57] ABSTRACT

A method and apparatus for atomizing oil of high viscosity by a venturi tube, whereby pressurized air is introduced from the outside into a reservoir through said venturi tube, while the oil in the reservoir is transported to the venturi through a conduit, or a suction tube, by the pressure differential between the oil reservoir and the open end of a nozzle and is heated in a heating chamber just before the atomization nozzle which is open into said venturi so as to provide fluidity to the oil.

10 Claims, 1 Drawing Figure

METHOD FOR ATOMIZING OIL AND AN APPARATUS THEREFOR

This is a continuation of application Serial No. 681,192 filed April 28, 1976, now abandoned.

FIELD OF THE INVENTION

This invention relates to a method for forming an oil mist and an apparatus therefor. The invention is particularly suited to atomize highly viscous oil and supply the required oil mist.

According to the invention, lubricating oils having high viscosities within a certain range, which conventionally require the heating of large quantities of supplied air to achieve atomization thereof, can be easily converted to the required air-mist mixture of high oil content without heating the air.

BACKGROUND OF THE INVENTION

Heretofore, the sole method which enables atomization of highly viscous oil has been thought to be in the heating of air to be supplied to approximately 93° C.-150° C., and no other practical method has yet been found. There was an attempt to reduce the viscosity of highly viscous oil by heating the oil thereby obtaining the desired oil fog, but the result was impractical in that the amount of the oil mist was absolutely too small. When the lubricating oil is heated and maintained at high temperatures, oxidative deterioration of the oil progresses so as to impair the performance of the oil. This is another drawback in the attempt to heat the oil. Although the atomization of a predetermined amount of highly viscous oil has become possible by the presently practiced method of heating the air to be supplied, the method also has its deficiencies. One of the drawbacks is that the heating of large quantities of air requires a much larger quantity of heat than heating the oil. Also, due to the necessity of a heating chamber for the air to be supplied, the size of the apparatus itself must be enlarged. Furthermore, because the lubricated portions of the machines are cooled by the air which transports the fluid lubricant in the form of oil mist, the cooling ability of the air-oil mist unavoidably decreases due to the reduction in specific gravity of the air when the supplied air is heated, assuming that the amount of the lubricating oil is kept constant. For example, comparing the air at room temperature (25° C.) with that at 120° C., the former is approximately 30% superior to the latter in cooling the lubricated portions of a machine. This presents a serious problem particularly when a temperature rise of a bearing and the like must be avoided in order to improve the performance of a machine on which the aerosol-type lubrication is practiced. The drawback is especially notable with severe lubricating conditions requiring a high viscosity oil.

SUMMARY OF THE INVENTION

The present invention offers a satisfactory solution to the above problems in heating oil, because it dispenses with the heating of the air to be supplied, drawbacks of which are removed, and offers an effective oil fog which can be supplied with uniformity.

In the oil-heating attempts of the past, the oil tank or reservoir was heated. Because normally the amount of oil to be used as the lubricant is much less than the oil stored in the tank, the greater part of the oil in the tank is maintained at high temperatures for a prolonged period, and is caused to be deteriorated by oxidation. Another problem is that the oil so heated is appreciably cooled due to the cooling of the air by expansion, on its way to the nozzle immediately before it is atomized by the supplied air, and therefore even when the oil is heated to a considerably high temperature in the tank, it is still difficult to reduce the viscosity of the oil under atomization to a satisfactory level.

According to the invention, the viscosity of the lubricating oil in the nozzle can be controlled without using heated air. That is, a heating element is installed in the path of oil immediately before the nozzle so that only the oil to be atomized can be heated. Therefore the heat loss from the oil through the wall of the suction tube is drastically reduced, and the predetermined desired amount of oil mist can be obtained by the method according to the present invention. To carry out said method, a suitable apparatus is provided as well by the present invention. The present method and apparatus also have an advantage over the prior art method in which the entire lubricating oil stored in the tank is maintained at high temperatures, in that the time during which the lubricating oil is maintained at the high temperature is extremely shortened, so that such detrimental effect as oxidative deterioration can be avoided. It is recommended that the oil-heating portion and nozzle portion of the apparatus be constructed of material with low thermal conductivity, because even when the lubricating oil is heated to 80° C., if a pipe of an ordinary metal with a 1-mm inner diameter is used and is projected into a stream of air of room temperature through a pipe approximately 2 mm long, the oil temperature falls by approximately 30° C., and the oil cannot be effectively maintained at the predetermined viscosity, and thus the amount of oil mist conveyed decreases. This drawback however can be drastically improved by the use of a nozzle made of heat insulating materials.

According to the present invention, furthermore, oil can be efficiently heated, whose viscosity must be controlled to give the predetermined amount of oil fog. Thus the invention has still another advantage over the use of heated air, in that the electric power consumption for heating the element is markedly less.

DETAILED DESCRIPTION OF THE INVENTION

Hereinafter an embodiment of this invention will be explained with reference to the drawing.

DESCRIPTION OF THE EMBODIMENTS

Figure 1:
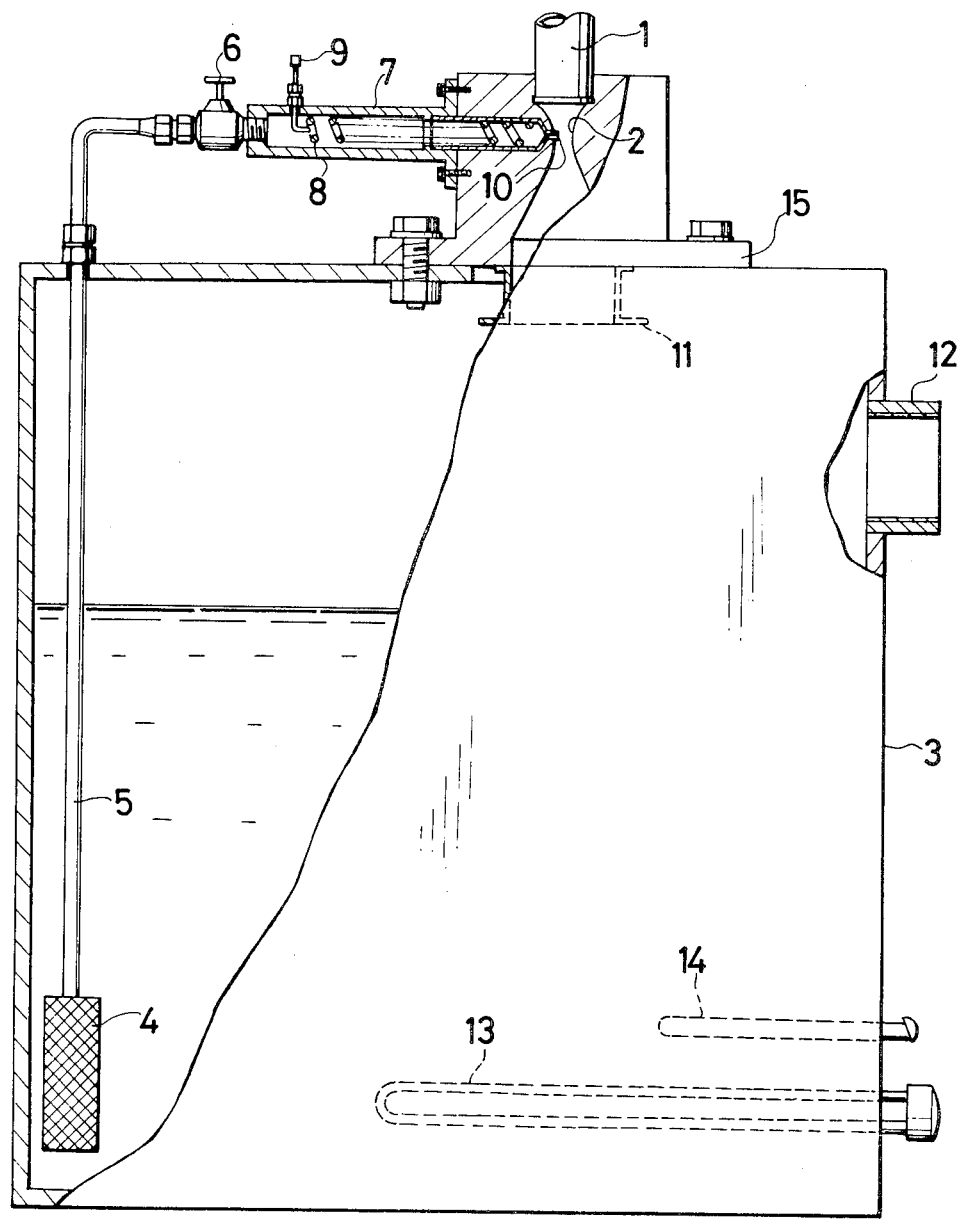
FIG. 1 shows an elevational view partly in section of the apparatus of the invention.

The apparatus of the embodiment comprises the oil tank 3, lubricating oil-heating chamber 7, nozzle 10, venturi 2 and a baffle plate 11. Although not shown in the drawing, the apparatus also comprises an oil-temperature controller and a constant-pressure air-generator.

The clean air is supplied from the constant-pressure air-generator through a filter (not shown), and is led from the air inlet pipe 1 into the venturi 2 for generating an oil mist which opens in the lid 15 of the oil tank 3. On the other hand, the lubricating oil to be atomized is stored in the tank 3, and is sucked with the negative pressure generated by the supplied air flow at the venturi portion, and led through the filter 4 and conduit 5, to the top of the oil tank, controlled of its flow rate by valve 6 and introduced into the lubricating oil-heating chamber 7. When such high viscosity lubricating oil of which a sufficient flow rate cannot be obtained due to the flow resistance offered by the viscosity in the path to the lubricating oil-heating chamber is used, the oil in the tank 3 may be pre-heated to a suitable temperature not detrimental to the performance of the lubricating oil, by a pre-heating element 13 mounted inside the tank 3. The specific pre-heating temperature depends on the viscosity of the oil.

For example, when oil having a viscosity of less than 80 centistokes at 37.8° C. is used, the above mentioned element 13 is unnecessary. The temperature in the tank is measured and controlled by the thermoelectric thermometer 14. The lubricating oil introduced into the heating chamber 7 is heated to a temperature at which the viscosity of the oil is reduced to the predetermined level, by an electric heating element 8 in a protective tube, installed in the heating chamber. The oil neither is oxidized nor deteriorated by a local rise in temperature caused by, for example, direct contact of the oil with the heater. The temperature in the heating chamber is measured and controlled by a thermoelectric thermometer 9. The lubricating oil, the viscosity of which is adjusted to the predetermined value in the heating chamber, is atomized at the nozzle 10 provided at the venturi portion, with the supplied air also introduced into the venturi portion. In order to effectively maintain the desired viscosity of the oil attained in the heating chamber containing the electric heating element at the end of said nozzle, it is desirable to construct the heating chamber and the nozzle with materials having low thermal conductivity such as foamed resin or foam glass. The lubricating oil atomized at the venturi portion as it is introduced through the nozzle first enters into the upper space of tank 3 and collides with the baffle plate 11 installed ahead of the venturi. Thus the large size oil particles adhere to the baffle plate and then return to the oil reservoir, separated from the small size particles. The oil mist from which the large size particles have been removed by the baffle plate is sent to the parts of the machine requiring lubrication under an elevated pressure, through the oil mist outlet 12 provided in the upper portion of the tank on the side wall encasing the space between the oil surface and the lid of the tank.

The advantages accomplished by the present invention are as follows:

(A) Because the oil is heated for only a short time immediately before atomization, such detrimental effect can be avoided as to oxidative or thermal deterioration of the oil.

(B) Because air of low temperatures can be used for atomizing, the cooling ability per unit amount of lubricating oil of the lubricated portion can be improved.

(C) The electric power consumption for heating the lubricating oil for atomizing is extremely small.

(D) Oil mist with a narrow distribution of particle diameters can be obtained from oils of widely varied viscosities.

In addition, there exists a close relationship between the heating method and the amount of oil mist as shown in the following Table 1, so that it is obviously recognizable that a considerably large amount of oil mist can be supplied with uniformity according to the heating method of the present invention.

Table 1
Correlation Between Heating Method And Amount Of Oil Mist

| Atomization Condition | Amount of Oil Mist (ml/h) |
| --- | --- |
| No heating | 9.85 |
| Heating of supplied air | 33.9 |
| Heating of lubricating oil in the nozzle with an electric heating element | 30.4 |

Note:
The test sample oil had the viscosity of 320 centistokes at 37:8° C.

What is claimed is:

1. A method for atomizing oil which comprises the steps of supplying a highly viscous oil stream from a reservoir to a gas stream from a nozzle having a discharge axis located perpendicular to the direction of the axis of said gas stream, passing said gas stream through a venturi throat located in direct opposition to the nozzle, passing the oil stream to be atomized through a heating chamber located downstream of said reservoir and just prior to discharging the oil from the nozzle, heating only the oil and only that portion of the oil that is in said heating chamber, passing said heated oil through said nozzle, contacting said heated stream of oil with the gas stream and atomizing the oil.

2. A method according to claim 1 including the steps of heating the oil by means of an electric heater located within said heating chamber and controlling the oil temperature as desired.

3. A method according to claim 2 wherein said oil is lubrication oil.

4. An oil-atomizing apparatus which comprises an oil reservoir provided with a top wall and an opening for discharging an oil mist at a side wall of said reservoir; a venturi tube having a throat therein for a gas to be supplied, said venturi tube extending through said top wall and into said reservoir; a nozzle which opens in a direction perpendicular to the axis and at the throat of said venturi tube, said nozzle being in fluid communication with said oil reservoir by means of a conduit; a heating chamber provided between said conduit and said nozzle and heating means in said heating chamber to heat only the quantity of the oil therein just prior to the discharge thereof into the throat of said venturi tube at a right angle to the direction of gas flow therethrough.

5. An oil-atomizing apparatus according to claim 4, wherein said heating chamber is provided with an electric heater to control the temperature of said heating chamber.

6. An oil-atomizing apparatus according to claim 5, wherein said heating chamber and nozzle are made of materials having low heat conductivity.

7. An oil-atomizing apparatus according to claim 6, wherein an oil flow control valve is provided between said conduit and heating chamber.

8. An oil-atomizing apparatus according to claim 7, wherein said oil is lubricant oil.

9. An oil-atomizing apparatus according to claim 7, wherein a preparatory heater is provided in the reservoir.

10. An oil-atomizing apparatus according to claim 9, wherein a baffle plate is provided at the upper part in the reservoir to separate the large size oil particles from the small sized oil particles and to return them to the reservoir.

* * * * *